No. 885,111.  
PATENTED APR. 21, 1908.  
J. VOLLMER.  
STEERING WHEEL PIVOT AND PIVOT BEARING FOR AUTOMOBILES.  
APPLICATION FILED JUNE 20, 1906.

Witnesses:  
Margaret E. Woolley  
Helen Orford

Inventor,  
Josef Vollmer,  
By Albert G. Davis  
Att'y.

UNITED STATES PATENT OFFICE.

JOSEF VOLLMER, OF BERLIN, GERMANY, ASSIGNOR TO GENERAL ELECTRIC COMPANY, A CORPORATION OF NEW YORK.

STEERING-WHEEL PIVOT AND PIVOT-BEARING FOR AUTOMOBILES.

No. 885,111.  Specification of Letters Patent.  Patented April 21, 1908.

Application filed June 20, 1906. Serial No. 322,592.

*To all whom it may concern:*

Be it known that I, JOSEF VOLLMER, a subject of the Grand Duke of Baden, Germany, residing at Berlin, Germany, have invented certain new and useful Improvements in Steering-Wheel Pivots and Pivot-Bearings for Automobiles, of which the following is a specification.

This invention relates to automobiles and similar vehicles, and its object is to improve the construction of the steering wheel pivots tnd pivot bearings which are carried by the forks at the ends of the stationary front axle to secure a uniform distribution of the weight upon the upper and lower pivot bearings; to prevent the falling out of the pivot when the axle is raised, or when for any other cause a steering wheel is deprived of the support of the roadway; to secure lubrication of the bearings and to provide for the ready removal of hhe pivots when necessary.

Figure 1:
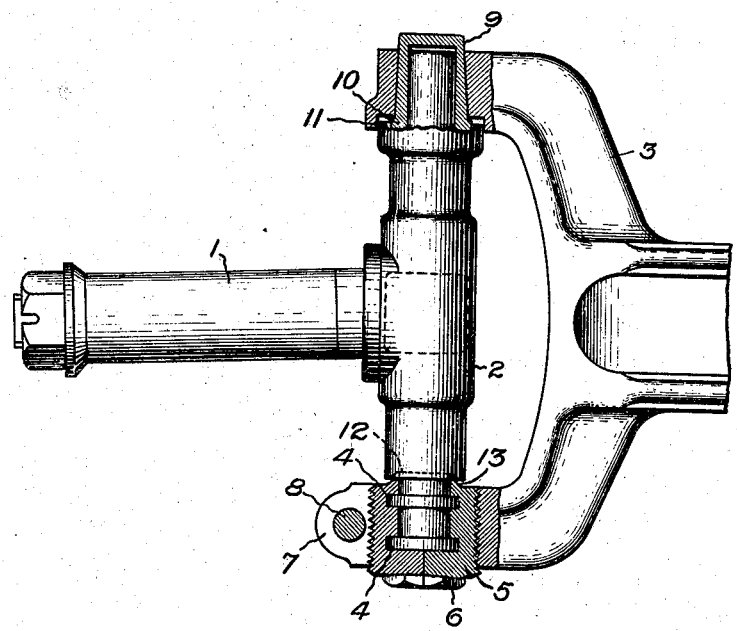
Figure 2:
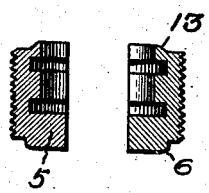

In the accompanying drawing which represents one of the embodiments of the invention, Figure 1 is an elevation, with parts in section, of an axle fork with the steering wheel pivot mounted therein; and Fig. 2 is a sectional view of the lower pivot bearing with its parts separated.

The steering wheels may be of ordinary construction, and each is mounted upon a short axle 1 of usual form which is carried by the upright pivot 2, mounted at its ends in bearings in the fork 3 of the stationary front axle of the vehicle. A lever of the usual type shown in dotted lines is secured to the pivot 2 and connected with the steering mechanism to communicate the necessary turning movements to the steering wheel.

The lower end of the pivot 2 has formed thereon or suitably secured thereto a plurality of thrust collars 4, two such collars being shown, but the number may be varied to secure the necessary area called for by the weight to be supported. These thrust collars engage grooves in the divided thrust bearing 5, formed of separable parts, Fig. 2, and adjustably secured in the lower branch of the fork 3. The bearing 5 has external screw threads which engage corresponding screw threads in the end of the fork and has a projection 6 of hexagonal or other form suitable for receiving a wrench for adjusting the bearing. The end of the lower branch of the fork is slotted at 7, and a bolt 8 passes through the two lugs thus formed. By means of this bolt the bearing 5 may be clamped in position after adjustment.

The upper branch of the fork carries a shell bearing 9, having a conical seat in said branch. This bearing has a collar or flange 10 at its lower end which bears against a shoulder formed on the upper end of the pivot and constitutes the thrust bearing at this end. An annular part 11 which may be integral with the pivot or separate therefrom, projects upward from the shoulder and surrounds the flange 10, thus forming a cup-shaped receptacle or reservoir for lubricant which keeps the upper thrust bearing constantly lubricated; the lubricant being admitted through a suitable opening. The end of the fork is recessed to receive the part 11 and protect the bearing from dust.

The structure just described provides an internal, well protected bearing wherein the lubrication will be maintained at all times making the steering of the vehicle much easier than in those bearings where a bolt or pivot passes directly through the fork, and the lubricant flows away almost as soon as it is applied.

The grooves in the bearing 5 which receive the thrust collars 4 retain the lubricant for that bearing, and also prevent the pivot from falling out when the wheel is not supported by the roadway. This bearing is protected from dust by the annular portion 12 of the pivot chambered out to receive the projection 13 upon the top of said bearing.

When the pivot is to be removed the clamp bolt 8 is unscrewed to release the bearing 5. The bearing is then unscrewed and the pivot lowered with it until the separable parts of the bearing may be drawn away from the thrust collars, and the pivot withdrawn from the fork. The diameters of the lower portion of the pivot are so much smaller than the hole in the lower branch of the fork as to make the removal possible.

The uniform distribution upon the upper and lower thrust bearings of the weight to be carried by the wheel is secured by releasing the clamping bolt 8 and adjusting the bearing 5. When the desired adjustment is obtained the clamping bolt is screwed up to hold the parts in proper relation.

This type of pivot and pivot bearings also makes possible a low specific pressure on the large, well lubricated bearing surfaces thus limiting and reducing the wear, causing a continuous and certain operation of the parts and avoiding damage from pounding due to shocks to which the vehicle is subjected in its operation.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a steering wheel pivot, of an axle fork having an upper bearing for the pivot, a removable lower bearing therefor which is divided to permit the removal of the pivot, and means for adjusting one of said bearings to secure a uniform distribution of the weight upon the bearings.

2. The combination with a steering wheel pivot, of an axle fork having upper and lower bearings for the pivot, the lower bearing being grooved, thrust collars on the pivot engaging the grooves and preventing the pivot from falling out, and means for adjusting one of said bearings to secure uniform distribution of the weight upon the bearings.

3. The combination with an axle fork, of a steering wheel pivot, thrust collars on the pivot, a bearing in the fork for the upper end of the pivot, a longitudinally divided, separable bearing for the lower end of the pivot mounted in the fork and having grooves to receive the thrust collars, and means for adjusting the lower bearing to secure a uniform distribution of the weight upon said bearings.

4. The combination with an axle fork, of a steering wheel pivot, thrust collars on the pivot, a bearing in the fork for the upper end of the pivot, a longitudinally divided, separable bearing for the lower end of the pivot mounted in the fork and having grooves to receive the thrust collars, means for adjusting the lower bearing to secure a uniform distribution of the weight upon the bearings, and a device for securing the lower bearing in its adjusted position.

5. The combination of a steering wheel pivot, a thrust bearing for the lower end of said pivot provided with grooves, thrust collars on the pivot engaging the grooves, a thrust bearing for the upper end of said pivot, and an oil reservoir surrounding the last named bearing to maintain a constant lubrication of said bearing.

6. The combination with an axle fork, of a steering wheel pivot having a shoulder near its upper end, a bearing in the fork for the lower end of the pivot, a bearing for the upper end of the pivot mounted in the fork and having a flange at the lower end engaging the shoulder on the pivot, and an annular part carried by the pivot surrounding the flange and shoulder and forming a reservoir to supply lubricant to the bearing between the flange and the shoulder.

7. The combination with an axle fork, of a conical shell bearing in the upper branch of the fork having a flange at one end, an adjustable, divided thrust bearing in the lower branch of the fork having internal grooves, a steering wheel pivot mounted in the bearings having a shoulder engaging the flange and thrust collars engaging the grooves, and an annular part carried by the pivot surrounding said flange and shoulder and forming a reservoir to supply lubricant to the bearing between the flange and shoulder.

8. The combination with an axle fork having a bearing in its upper branch, a recess surrounding the lower end of the bearing, a grooved bearing in the lower branch of the fork, and a projection on the top of the last named bearing, of a steering wheel pivot mounted in said bearings and provided with thrust collars engaging the grooves in the lower bearing, an annular portion entering the recess in the upper bearing and an annular recess which receives the projection on the lower bearing, and means for adjusting the lower bearing to secure a uniform distribution of the weight upon the bearings.

In witness whereof, I have hereunto set my hand this twenty-fifth day of May, 1906.

JOSEF VOLLMER.

Witnesses:
JULIUS RUMLAND,
KARL KREKELLEN.